United States Patent
Huber et al.

(10) Patent No.: US 9,941,764 B2
(45) Date of Patent: Apr. 10, 2018

(54) ELECTRIC MACHINE WITH A STATOR AND A ROTOR

(71) Applicant: Robert Bosch GmbH, Stuttgart (DE)

(72) Inventors: Michael Huber, Rheinmuenster (DE); Christian Aumann, Stuttgart (DE); Andrew Pierson, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 14/654,561

(22) PCT Filed: Dec. 12, 2013

(86) PCT No.: PCT/EP2013/076318
§ 371 (c)(1),
(2) Date: Jun. 22, 2015

(87) PCT Pub. No.: WO2014/095549
PCT Pub. Date: Jun. 26, 2014

(65) Prior Publication Data
US 2015/0349600 A1    Dec. 3, 2015

(30) Foreign Application Priority Data

Dec. 21, 2012  (DE) .......................... 10 2012 224 150

(51) Int. Cl.
*H02K 3/34*   (2006.01)
*H02K 3/38*   (2006.01)
*H02K 3/52*   (2006.01)

(52) U.S. Cl.
CPC .............. *H02K 3/34* (2013.01); *H02K 3/345* (2013.01); *H02K 3/38* (2013.01); *H02K 3/522* (2013.01)

(58) Field of Classification Search
CPC ............ H02K 3/34; H02K 3/345; H02K 3/38
See application file for complete search history.

(56) References Cited

U.S. PATENT DOCUMENTS

| 4,340,829 A | 7/1982 | McCoy |
| 8,227,948 B1 * | 7/2012 | Fox .......................... H02K 1/06 310/50 |
| 8,853,913 B2 * | 10/2014 | Tang ..................... H02K 3/345 310/215 |

(Continued)

FOREIGN PATENT DOCUMENTS

| CN | 1705190 A | 12/2005 |
| CN | 101667756 A | 3/2010 |
| CN | 201887620 U | 6/2011 |

(Continued)

OTHER PUBLICATIONS

International Search Report for Application No. PCT/EP2013/076318 dated Nov. 5, 2014 (English Translation, 2 pages).

*Primary Examiner* — Ramon M Barrera
(74) *Attorney, Agent, or Firm* — Michael Best & Friedrich LLP

(57) ABSTRACT

The invention concerns an electric machine with a stator and a rotor, comprising a plate stack with a plurality of superposed plates with windings which can be energized. Disposed at at least one end of the plate stack is an insulating plate. Furthermore, insulating strips are provided on the plate stack, between adjacent windings, which are supported on radially protruding shoulders on the insulating plate.

20 Claims, 3 Drawing Sheets

(56) References Cited

U.S. PATENT DOCUMENTS

2008/0116761 A1  5/2008 Lin et al.
2009/0324435 A1  12/2009 Sears et al.

FOREIGN PATENT DOCUMENTS

| CN | 201918819 U | 8/2011 |
|---|---|---|
| DE | 2014616 | 10/1971 |
| DE | 102008064132 | 9/2009 |
| EP | 1947755 | 7/2008 |
| JP | 5553157 | 4/1980 |
| JP | 11332152 | 11/1999 |

\* cited by examiner

ELECTRIC MACHINE WITH A STATOR AND A ROTOR

BACKGROUND OF THE INVENTION

The invention relates to an electric machine with a stator and a rotor with a plate stack having a plurality of plates stacked on top of one another, with energizable windings in the plate stack, wherein an insulating plate is arranged at an end of the plate stack, with insulating strips between adjacent windings on the plate stack.

Electric machines with stators which are constructed from a plate stack which is formed from a plurality of stator plates made of a sheet-metal material stacked on top of one another are known. In each case, an insulating plate made of electrically insulating material is arranged at the two ends of the plate stack, wherein one of the insulating plates on the side which faces away from the plate stack is connected to a connection plate via which coil windings in the stator are connected to the power supply. For electrical insulation, there are insulating strips of paper between two coil windings.

When the stator is assembled, firstly the plate stack is constructed from the individual plates, then the insulating paper strips are inserted and the winding is done in a winding machine. In this connection, care should be taken, inter alia, that the insulating paper strips maintain their position between the adjacent windings.

SUMMARY OF THE INVENTION

The invention is based on the problem of designing, using simple constructive measures, an electric machine which is easy to assemble.

The electric machine according to the invention can be used, for example, as drive motor in motor vehicles or in hand-operated machine tools. The electric machine is, for example, an internal-rotor motor with an outer surrounding stator and an inner rotor.

The stator or the rotor has a plate stack having a plurality of plates which are stacked on top of one another, wherein energizable windings are wound on carrier teeth of the plates. An insulating plate made of an electrically insulating material is arranged at at least one end of the plate stack. Expediently, there is in each case an insulating plate at each of the two ends, wherein, in a preferred embodiment, one of the insulating plates on the side which faces away from the plate stack can be connected to a connection disk via which the coil windings in the plate stack are energized.

The coil windings are electrically insulated from one another via insulating strips which extend between the windings at least approximately or at least with one component in the axial direction of the plate stack. The insulating strips are an additional security against an undesired electrical short circuit in the event that the insulating layer on the winding wire of a winding is accidentally damaged. The insulating strip extends in the axial direction over the entire length of the adjacent windings.

In order to ensure that the insulating strip maintains its setpoint position in the axial direction during assembly, a radially projecting shoulder is formed on the insulating plate and forms an axial stop for the insulating strips. The radially projecting stop on the insulating plate limits the axial position of the insulating strip. Optionally, security against slipping in the circumferential direction is also increased. The stop is used for pre-positioning or for maintaining the position until the winding is wound around the insulating strip.

A plurality of radially projecting shoulders are arranged on the insulating plate in a manner distributed around the circumference. On the insulating plate, precisely one shoulder as stop is assigned to each insulating strip. When viewed in the circumferential direction, the stops are located according to the position of the insulating strips between the carrier teeth in the plate stack or the insulating plate around which the coil windings are disposed.

Provided that in each case an insulating plate is arranged at the opposite ends of the plate stack, said insulating plates are identically constructed, with the result that, for each insulating strip, an upper and a lower stop for axial limiting is arranged in the region of the two axial ends of the plate stack.

The radially projecting shoulders are advantageously located at an end of the insulating plate, wherein the insulating plate is connected to the plate stack in such a way that the radially projecting shoulder is on the side which faces away from the plate stack. What is ensured as a result of this is that an additional axial receptacle region for the insulating strip is given between the end of the plate stack and the radially projecting shoulder, and thus the insulating strip can project axially over the end of the plate stack. In the case of two insulating plates arranged at opposite ends of the plate stack, there is also correspondingly an axial projection of the insulating strips at both ends.

The individual plates from which the plate stack is constructed advantageously have an outer carrier ring and carrier teeth which extend radially inward and are for receiving the coils. However, an embodiment with an inner disk and carrier teeth which extend radially outward is also possible. Both embodiments for stators with a plate stack and for rotors or armatures with a plate stack come into consideration. Depending on the embodiment of the plate stack or the individual plates from which the plate stack is constructed, the insulating plates also have a corresponding shape. In the case of an outer ring with carrier teeth which extend radially inward, the shoulders are located on the radially inner side of the outer or carrier ring and project radially inward. In contrast, the shoulders are located on the radial outer side of an insulating plate embodied as a disk with carrier teeth which extend radially outward.

In principle, all electrically insulating materials come into consideration as insulating strips. According to a preferred embodiment, the insulating strips are embodied as paper strips.

According to another expedient embodiment, the plate stack has an oblique embodiment, with the result that the coil windings run obliquely with respect to the longitudinal axis of the plate stack. Accordingly, the insulating strips are also arranged so as to run obliquely on the plate stack and assume an angle with respect to the longitudinal axis of the plate stack.

According to another advantageous embodiment, the insulating plates can be connected in a form-fitting manner to the plate stack. For this purpose, the insulating plates have, for example, one or more axially projecting fixing bolts as form-fitting element, which fixing bolts protrude into assigned cutouts in the individual plates of the plate stack. The fixing bolts are preferably formed in one piece with the insulating plates.

BRIEF DESCRIPTION OF THE DRAWINGS

Further advantages and expedient embodiments can be gathered from the further claims, the description of the figures and the drawings, in which:

In the figures, identical components are provided with identical reference signs.

DETAILED DESCRIPTION

Figure 1:
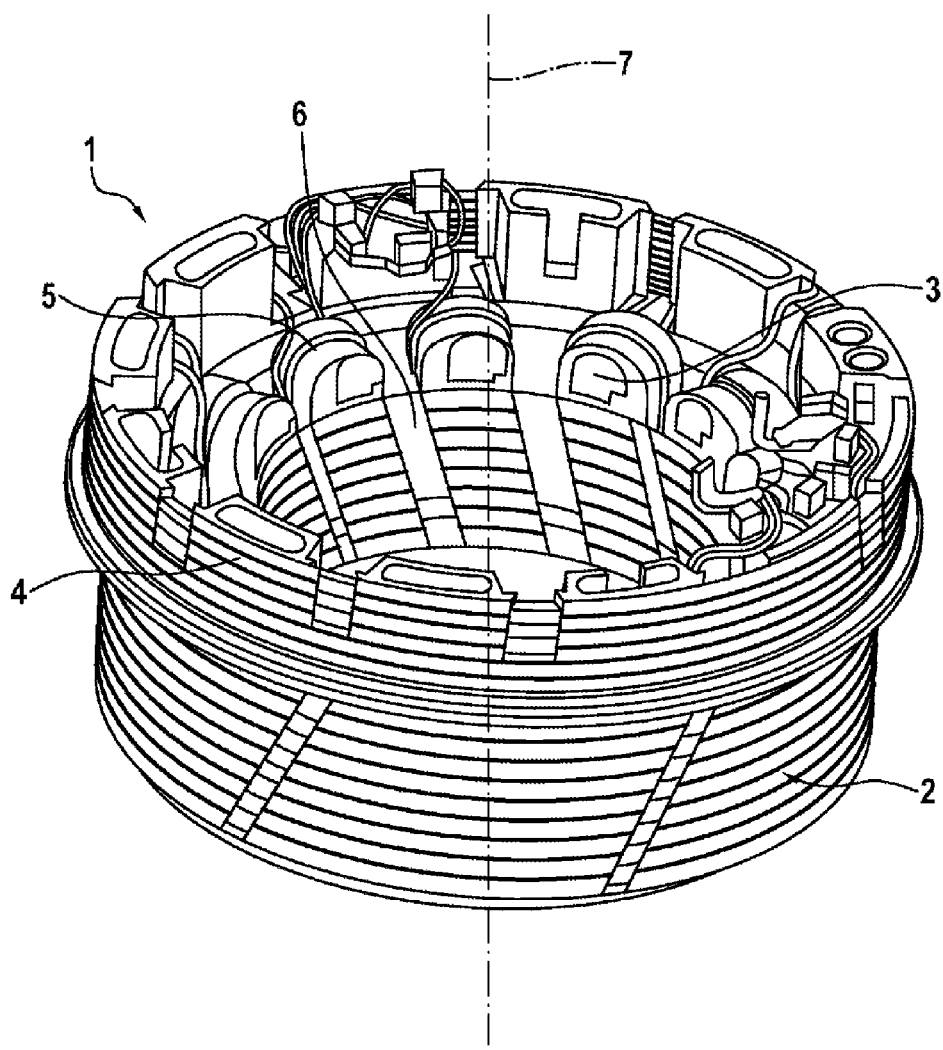
FIG. 1 shows a perspective view of a stator of an electric machine with a plate stack and a connection disk attached at one end, wherein an insulating plate is arranged between the plate stack and the connection disk.

FIG. 1 illustrates a stator 1 for an electric machine, in particular for an electric internal-rotor motor. The stator 1 has a stator stack or plate stack 2, which is constructed from a multiplicity of individual stator plates which are stacked on top of one another. Furthermore, a connection disk 4 is arranged at the end of the plate stack 2, via which connection disk the windings 5 in the plate stack 2 are supplied with current. An insulating plate 3 is arranged between the plate stack 2 and the connection disk 4, which insulating plate is composed of an electrically insulating material, in particular of plastic. The insulating plate 3 can be embodied as a plastic injection-molded part. A corresponding insulating plate is additionally located at the opposite axial end of the plate stack 2.

The plate stack 2 has an oblique embodiment and has carrier teeth which are directed radially inward and around which the windings 5 are disposed. Owing to the obliqueness, the windings 5 run at an angle to the stator longitudinal axis 7.

In each case an insulating strip 6 is located between adjacent windings 5, said insulating strip extending over the entire axial height of the plate stack 2. Owing to the oblique embodiment of the plate stack 2, the insulating strips 6 are also at an angle with respect to the longitudinal axis 7 of the plate stack. The length of the insulating strips 6 is measured such that the insulating strips project beyond the two ends of the plate stack 6. The insulating strips 6, which are embodied by way of example as paper strips, are accommodated in the region of their respective free end sections by the insulating plates 3 and held, which are located at the two ends of the plate stack 2.

Figure 2:
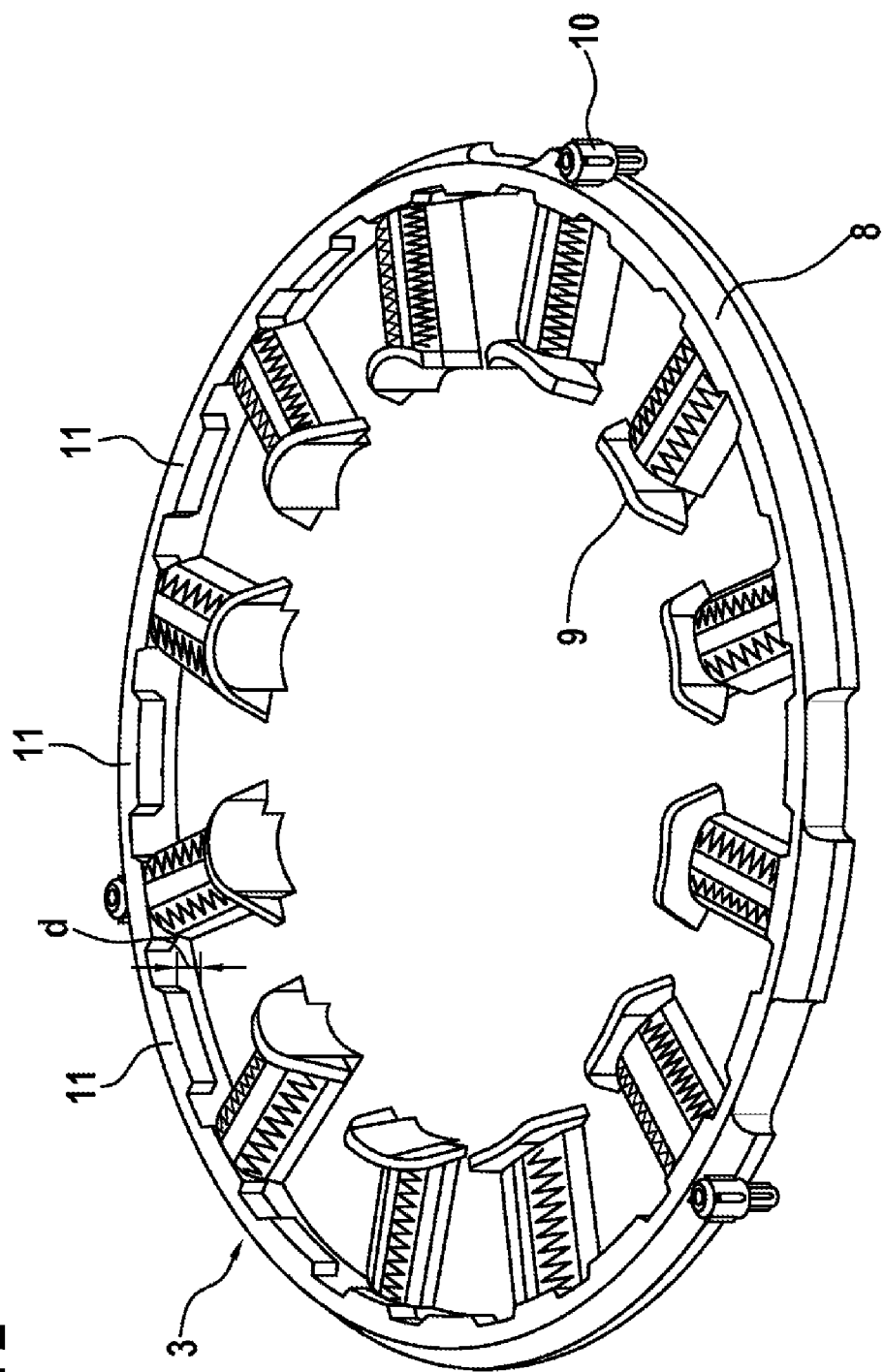
FIG. 2 shows a perspective view of an insulating plate.
Figure 3:
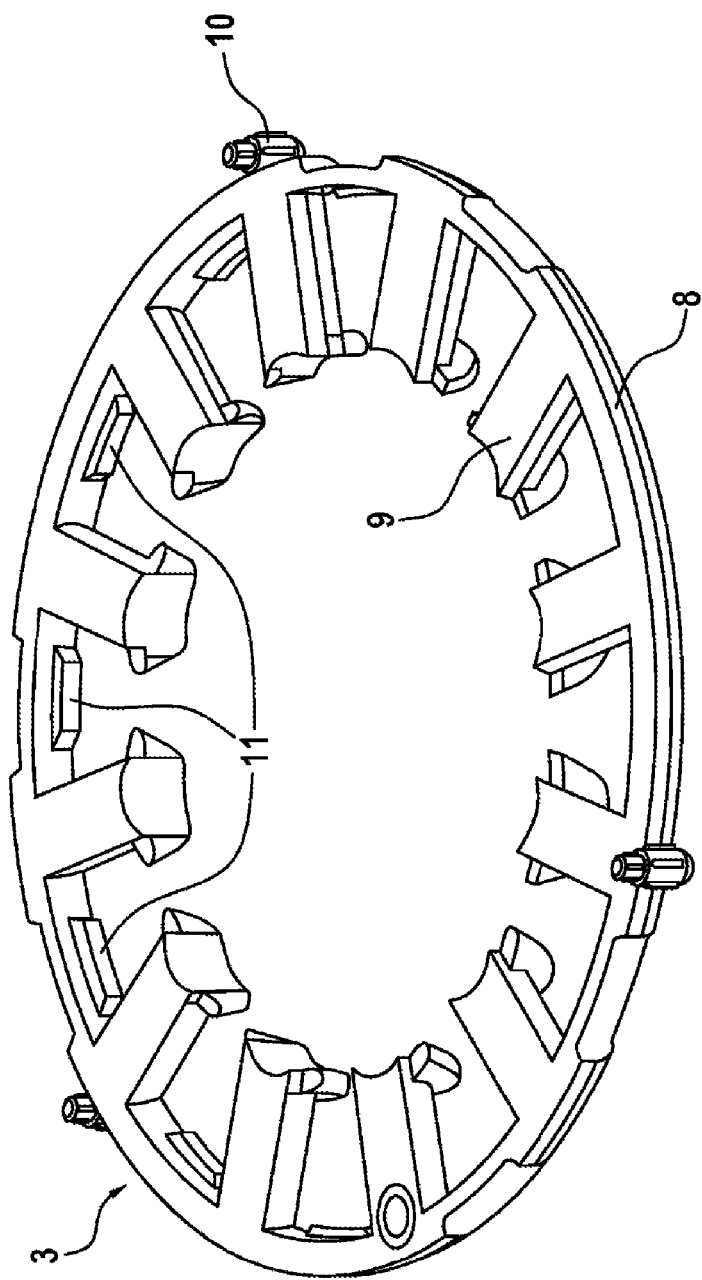
FIG. 3 shows the insulating plate in another perspective view.

FIG. 2 illustrates an insulating plate 3 in a view from above; FIG. 3 illustrates same in a view from below. The insulating plate 3, which is manufactured from an electrically insulating material, for instance plastic, has a surrounding outer or carrier ring 8 on which a plurality of carrier teeth 9 extend radially inward in a manner distributed about the circumference, which carrier teeth are used for receiving the coil windings. In total, there are three fixing bolts 10 on the outer circumference of the carrier ring 8 which are distributed about the circumference of the carrier ring and form form-fitting elements and protrude, in the assembled state, into assigned cutouts in the plates of the plate stack and/or in the connection disk, A shoulder 11 which is directed radially inward and forms an axial stop for the insulating strip 6 (FIG. 1) is located in each case between two adjacent carrier teeth 9 on the radially inner side of the carrier ring 8. The shoulder 11 is located axially on the upper end of the carrier ring 8 which faces away from the plate stack in the assembled state. As a result of this, an axial receiving area with the extent d is given in the insulating plate 3 between the underside of the shoulder 11 and the lower end of the carrier ring 8, into which receiving area the end sections of the insulating strip can extend. The insulating strip is therefore designed to be axially longer than the plate stack and protrudes beyond the end of the plate stack at most until it reaches the stop 11. The stop limits the receiving area for the insulating strips in the axial direction and, at the same time, supports the guidance of the insulating strip in the circumferential direction. Optionally, lateral stop elements for guiding and supporting the insulating strip in the circumferential direction are additionally provided on the inner side of the carrier ring 8 adjacent to the shoulder 11.

The shoulders 11 are formed in one piece with the insulating plate 3.

What is claimed is:

1. An electric machine with a stator (1) or a rotor, comprising
    a plate stack (2) having a plurality of plates stacked on top of one another;
    energizable windings (5) in the plate stack (2);
    insulating strips (6) between adjacent windings (5) on the plate stack (2), wherein the insulating strips (6) are arranged so as to run obliquely on the plate stack (2) and assume an angle with respect to a longitudinal axis (7) of the plate stack (2);
    an insulating plate (3) arranged at an end of the plate stack (2), wherein radially projecting shoulders (11) are arranged on the insulating plate (3) and form an axial stop for an insulating strip (6) and limit an axial position of the insulating strip (6); and
    a connection disk (4) arranged at the end of the plate stack (2), wherein the windings (5) in the plate stack (2) are supplied with current via the connection disk (4), and wherein the insulating plate (3) is arranged between the plate stack (2) and the connection disk (4).

2. The electric machine as claimed in claim 1, characterized in that the radially projecting shoulders (11) are arranged at an end of the insulating plate (3).

3. The electric machine as claimed in claim 2, characterized in that the radially projecting shoulders (11) are arranged at the end of the insulating plate (3) which faces away from the plate stack (2).

4. The electric machine as claimed in claim 1, characterized in that the shoulders (11) project radially inward.

5. The electric machine as claimed in claim 1, characterized in that the insulating plate (3) is made of plastic.

6. The electric machine as claimed in claim 1 characterized in that the plate stack (2) is part of the stator (1).

7. The electric machine as claimed in claim 1, characterized in that the insulating strips (6) are paper strips which extend along an axial direction of grooves for the windings (5).

8. The electric machine as claimed in claim 1, characterized in that the plates of the plate stack (2) have an outer carrier ring (8) and carrier teeth (9) which point radially inward for receiving windings (5), wherein in each case a radially projecting shoulder (11) is arranged between two carrier teeth (9).

9. The electric machine as claimed in claim 1, characterized in that in each case an insulating plate (3) with radially projecting shoulders (11) is arranged at two ends of the plate stack (2).

10. The electric machine as claimed in claim 1, characterized in that the insulating plate (3) is made of plastic and has insulating carrier teeth for the stator teeth, which insulating carrier teeth are formed in one piece and extend radially inward from a carrier ring (8).

11. The electric machine as claimed in claim 7, characterized in that in each case an insulating plate (3) with radially projecting shoulders (11) is arranged at axial ends of the grooves.

12. The electric machine as claimed in claim 1, characterized in that the insulating strips (6) and also grooves are arranged so as to run obliquely on the plate stack (2) and assume an angle with respect to a longitudinal axis (7) of the plate stack (2).

13. The electric machine as claimed in claim 3, characterized in that the shoulders (11) project radially inward.

14. The electric machine as claimed in claim 13, characterized in that the insulating plate (3) is made of plastic.

15. The electric machine as claimed in claim 14, characterized in that the plate stack (2) is part of the stator (1).

16. The electric machine as claimed in claim 15, characterized in that the insulating strips (6) are paper strips which extend along an axial direction of grooves for the windings (5).

17. The electric machine as claimed in claim 16, characterized in that the plates of the plate stack (2) have an outer carrier ring (8) and carrier teeth (9) which point radially inward for receiving windings (5), wherein in each case a radially projecting shoulder (11) is arranged between two carrier teeth (9).

18. The electric machine as claimed in claim 17, characterized in that in each case an insulating plate (3) with radially projecting shoulders (11) is arranged at two ends of the plate stack (2).

19. The electric machine as claimed in claim 18, characterized in that the insulating strips (6) are arranged so as to run obliquely on the plate stack (2) and assume an angle with respect to a longitudinal axis (7) of the plate stack (2).

20. The electric machine as claimed in claim 1, wherein lateral stop elements for guiding and supporting the insulating strips (6) in the circumferential direction are provided on an inner side of the carrier ring (8) adjacent to the shoulder (11).

\* \* \* \* \*